(12) United States Patent
Bellinger et al.

(10) Patent No.: US 11,441,468 B2
(45) Date of Patent: Sep. 13, 2022

(54) CONTROLS FOR VEHICLE SYSTEMS INCLUDING SCR EXHAUST AFTERTREATMENT AND NEUTRAL AT STOP CAPABILITY

(71) Applicant: Cummins Inc., Columbus, IN (US)

(72) Inventors: Steven M. Bellinger, Columbus, IN (US); Benjamin Bailey, Columbus, IN (US); Jonathan S. Stichter, Columbus, IN (US); Julio E. Munoz, Columbus, IN (US); Kalkidan Said, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/321,789

(22) Filed: May 17, 2021

(65) Prior Publication Data

US 2021/0355852 A1    Nov. 18, 2021

Related U.S. Application Data

(60) Provisional application No. 63/126,651, filed on Dec. 17, 2020, provisional application No. 63/026,244, filed on May 18, 2020.

(51) Int. Cl.
*F01N 3/20* (2006.01)
*F16H 45/02* (2006.01)
(Continued)

(52) U.S. Cl.
CPC .............. *F01N 3/208* (2013.01); *B60K 17/02* (2013.01); *B60K 17/10* (2013.01); *F01N 3/2006* (2013.01);
(Continued)

(58) Field of Classification Search
CPC .... F01N 3/208; F01N 3/2006; F01N 2900/04; F01N 2900/08; F01N 2900/1602;
(Continued)

(56) References Cited

U.S. PATENT DOCUMENTS

6,270,443 B1    8/2001    Ito et al.
6,494,808 B2    12/2002    Lee
(Continued)

*Primary Examiner* — Brandon D Lee
(74) *Attorney, Agent, or Firm* — Taft Stettinius & Hollister LLP (57) ABSTRACT

A vehicle system includes an engine, a transmission including a torque converter, a clutch configured to selectably couple and decouple the torque converter, and a gearset, a selective catalytic reduction (SCR) exhaust aftertreatment system. An electronic control system may be operatively coupled with the engine, the electronically controllable clutch, and the SCR exhaust aftertreatment system. The electronic control system is configured to evaluate whether an SCR catalyst temperature satisfies at least one minimum temperature criterion, in response to the SCR catalyst temperature satisfying the minimum temperature criterion, permit a neutral at stop operation wherein the electronically controllable clutch is controlled to selectably decouple the torque converter and the one or more gears at least in part in response to the vehicle system being in a stopped state, and in response to the SCR catalyst temperature not satisfying the minimum temperature criterion, prevent the neutral at stop operation.

26 Claims, 6 Drawing Sheets

(51) Int. Cl.
  *F16D 28/00*   (2006.01)
  *B60K 17/02*   (2006.01)
  *B60K 17/10*   (2006.01)
  *F16H 47/06*   (2006.01)
  *F16H 45/00*   (2006.01)

(52) U.S. Cl.
  CPC ............. *F16D 28/00* (2013.01); *F16H 45/02* (2013.01); *F16H 47/06* (2013.01); *F01N 2900/04* (2013.01); *F01N 2900/08* (2013.01); *F01N 2900/1602* (2013.01); *F16H 2045/005* (2013.01)

(58) Field of Classification Search
  CPC ..... F01N 2590/11; B60K 17/02; B60K 17/10; F16D 28/00; F16D 48/06; F16H 45/02; F16H 47/06; F16H 2045/005; F16H 2061/0018; F16H 2312/20; Y02A 50/20
  See application file for complete search history.

(56) References Cited

U.S. PATENT DOCUMENTS

| | | |
|---|---|---|
| 7,380,396 B2 | 6/2008 | Kresse |
| 9,611,907 B2 * | 4/2017 | Dickson ................. F16D 48/06 |
| 9,670,855 B2 | 6/2017 | Dickson et al. |
| 9,958,059 B2 | 5/2018 | Hu et al. |
| 10,308,252 B2 | 6/2019 | Xu et al. |
| 2005/0288150 A1 | 12/2005 | Hitch et al. |
| 2016/0040616 A1 * | 2/2016 | Dickson ................ F02D 41/123 |
| | | 701/54 |
| 2019/0024552 A1 * | 1/2019 | Uhrich ................ F02D 41/1448 |

* cited by examiner

CONTROLS FOR VEHICLE SYSTEMS INCLUDING SCR EXHAUST AFTERTREATMENT AND NEUTRAL AT STOP CAPABILITY

CROSS-REFERENCE

The present application claims priority to and the benefit of U.S. application Ser. No. 63/026,244, filed May 18, 2020, and U.S. application Ser. No. 63/126,651, filed Dec. 17, 2020, which are hereby incorporated by reference.

BACKGROUND

The present disclosure relates generally to vehicle controls and more particularly, but not exclusively, to apparatuses, methods, systems, and techniques for controlling vehicle systems including selective catalytic reduction (SCR) exhaust aftertreatment and neutral at stop capability. SCR exhaust aftertreatment systems offer potential benefits for reducing tailpipe emissions of oxides of nitrogen (NOx). Neutral at stop (NAS) capability, sometimes referred to as neutral idle control (NIC) capability, offers substantial potential benefits for reducing fuel consumption and increasing fuel economy particular, though not exclusively for vehicles equipped with torque converters which, absent such capabilities, impose substantial loads during engine idling of a stopped vehicle. Interoperability of SCR aftertreatment and NAS systems and concurrent operation of such systems pose a number of unmet challenges and obstacles. There remains a significant need for the unique apparatuses, methods, systems, and techniques disclosed herein.

DISCLOSURE OF EXAMPLE EMBODIMENTS

For the purposes of clearly, concisely and exactly describing example embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Example embodiments include unique methods and systems for controlling vehicle systems. Certain embodiments enable and disable NAS capability of a vehicle system in response an SCR catalyst temperature. Further embodiments, forms, objects, features, advantages, aspects, and benefits shall become apparent from the following description and drawings.

DETAILED DESCRIPTION OF EXAMPLE EMBODIMENTS

Figure 1:
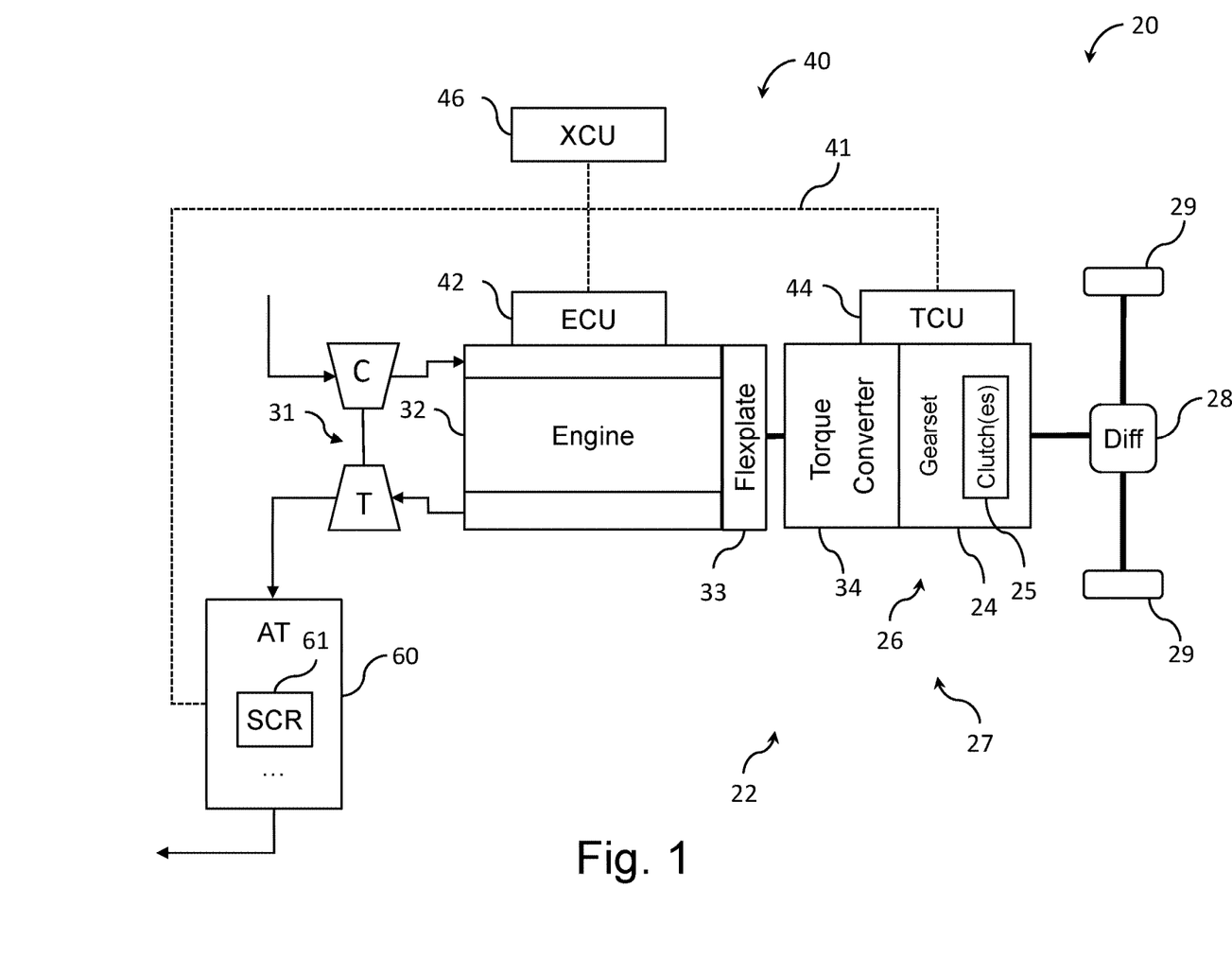
FIGS. 1 and 2 are schematic diagrams illustrating certain aspects of an example vehicle system.

With reference to FIG. 1, there is illustrated an example vehicle system 20. In the illustrated example, the vehicle system 20 includes a powertrain 22 including an internal combustion engine 32, a flexplate 33, a transmission 24, a differential 28, and ground engaging wheels 29. It shall be appreciated that the flexplate 33, transmission 24, differential 28, and ground engaging wheels 29 may be considered components of a driveline 27 operatively coupled with an output shaft of engine 32. In the illustrated example, the vehicle system 20 may be propelled by the ground engaging wheels 29 provided as rear wheels; however, in other embodiments, front-wheel drive, four-wheel drive, and all-wheel drive approaches are contemplated. In one aspect, the vehicle system 20 may be an on-road bus, delivery truck, a service truck or the like. In other aspects, the vehicle system 20 may be a different type of vehicle, including other types of on-road or off-road vehicles.

The powertrain 22 includes the internal combustion engine 32 operatively coupled with and configured to provide torque to a flexplate 33 which may alternatively be provided as a flywheel. The flexplate 33 may be operatively coupled with and configured to provide torque to a transmission 26. In the illustrated embodiment, the flexplate 33 may be configured to provide torque to torque converter 34 of transmission 26, it being appreciated that other embodiments may not include a torque converter and flexplate (or a flywheel) coupled with the transmission 26. The torque converter 34 may be operatively coupled with and configured to provide torque to clutch 25 which may, in turn, be operatively coupled with and configured to provide torque to gear set 24. The gear set 24 may be configured, for example, as a planetary gear set (e.g., if transmission 26 is configured as an automatic transmission) or as belts or other non-gear forms (e.g., if transmission 26 is configured as continuously variable transmission). The gear set 24 may be operatively coupled with and configured to provide torque to differential 28 which may, in turn, be operatively coupled with and configured to provide torque to the ground engaging wheels 29. In other embodiments, the wheels 29 may be provided as wheels, treads, tracks, or other ground-contacting members. In some embodiments, ground-contacting members may alternatively be configured as other load engaging members (e.g., propellers or an electrical machine).

In the illustrated embodiment, the engine 32 is configured as a turbocharged, compression-ignition diesel engine. It shall be appreciated that the engine 32 may be provided as another type of engine in other embodiments. In the illustrated embodiment, the powertrain 22 is powered only by the engine 32. The powertrain 22 may be provided with a turbocharger 31 including a turbine 37 and a compressor 38. The turbine 37 extracts exhaust gas from the engine 32 to drive the compressor 38 to force air back to the engine 32. In other embodiments, the powertrain 22 may be provided with torque from additional components such as an electric motor operatively coupled with a battery or other energy storage system (e.g., in embodiments where the powertrain is configured as a hybrid powertrain), one or more vehicle accessories or other power providing component.

In the illustrated embodiment, the vehicle system 20 may include an exhaust aftertreatment system 60 provided downstream of the engine 32 that injects a liquid-reductant agent through a special catalyst into the exhaust stream of a diesel engine. The exhaust aftertreatment system 60 may include a selective catalyst reduction (SCR) catalyst 61 configured to inject a liquid-reductant agent into the exhaust stream.

The vehicle system 20 includes an electronic control system (ECS) 40 which includes an engine control unit (ECU) 42, a transmission control unit (TCU) 44, and may also include one or more additional control units (XCU) 46. The ECU 42, TCU 44, and XCU 46 may each be implemented or provided in a single or unitary physical module or in a combination of two or more operatively coupled physical modules. The ECU 42, TCU 44, and XCU 46 (where present) are operatively coupled with and configured for communication over a network 41 which may be configured as a controller area network (CAN) or another type of network providing communication capabilities. The ECS 40 is also operatively coupled with various components and systems of the vehicle system 20 via network 41 or one or more additional or alternative networks.

In the illustrated embodiment, the ECS 40 includes a plurality of programmable microprocessors or microcontrollers of a solid-state, integrated circuit type which are provided in a plurality of control units. The ECS 40 can be implemented in any of a number of ways that combine or distribute the control function across one or more control units in various manners. The ECS 40 executes operating logic that defines various control, management, and/or regulation functions. This operating logic may be in the form of dedicated hardware, such as a hardwired state machine, analog calculating machine, programming instructions, and/or a different form as would occur to those skilled in the art. The ECS 40 may be provided as a single component or a collection of operatively coupled components; and may be comprised of digital circuitry, analog circuitry, or a hybrid combination of both of these types. When of a multi-component form, the ECS 40 may have one or more components remotely located relative to the others in a distributed arrangement. The ECS 40 can include multiple processing units arranged to operate independently, in a pipeline processing arrangement, in a parallel processing arrangement, or the like. It shall be further appreciated that the ECS 40 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

In the illustrated embodiment, the ECS 40 includes ECU 42 operatively coupled with the powertrain 22 and the exhaust aftertreatment system 60. The ECU 42 may be configured to evaluate an exhaust thermal management metric indicating operation of the system 20 to increase an exhaust aftertreatment temperature using energy that does not contribute to torque output of the engine 32. The ECU 42 is configured to dynamically control a neutral at stop (NAS) operation as further described herein.

Figure 2:
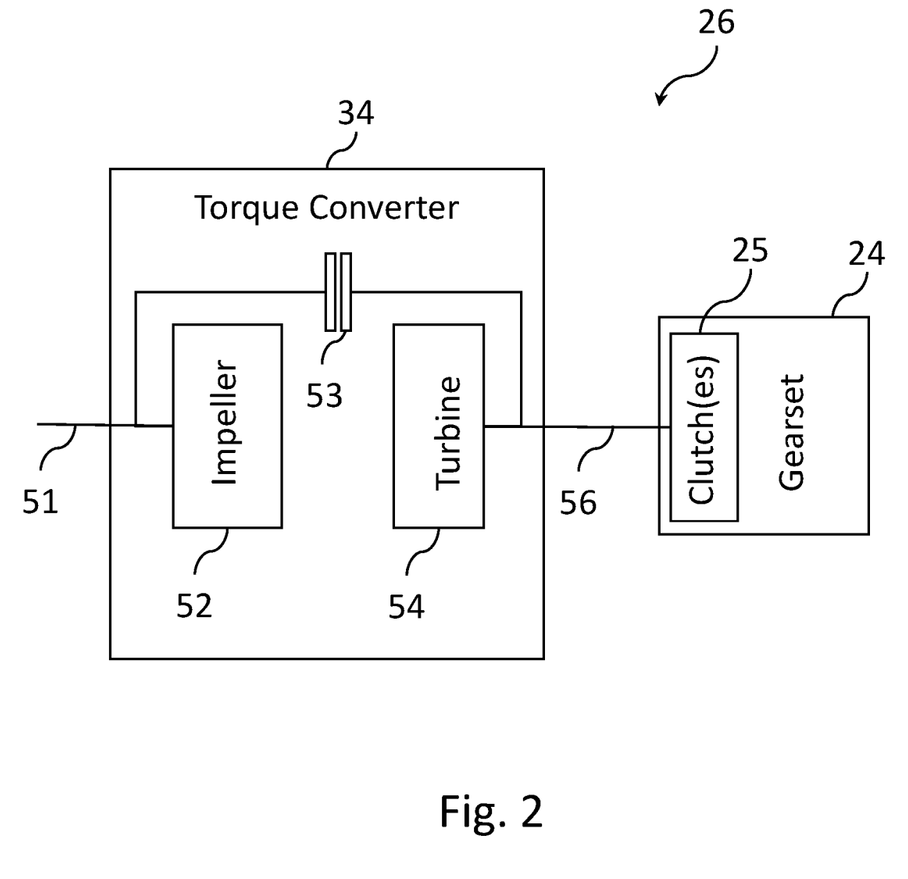

With reference to FIG. 2, there are illustrated further aspects of the torque converter 34 and the gearset 24 of the transmission 26 of the vehicle system 20. The torque converter 34 includes an mechanical coupling 51 (e.g., one or more capscrews or other fasteners or couplings) which mechanically couples the torque converter 34 with the flexplate 33 (not depicted in FIG. 2), an impeller 52 which is mechanically coupled with the mechanical coupling 51, a turbine 54, and an output shaft 56 which is mechanically coupled with the turbine 54 and gearset 24 which may include one or more clutches 25. The torque converter 34 may also include a lockup clutch 53 which is controllable to selectably mechanically couple and decouple the impeller 52 and the turbine 54. When the lockup clutch 53 is closed or engaged, torque is mechanically transferred from the impeller 52 to the turbine 54. When the lockup clutch 53 is open or disengaged, torque is transferred from the impeller 52 to the turbine 54 via fluid pumped by the impeller 53 to drive the turbine 54. The clutch 25, the gearset 24, and the lockup clutch 53 may be electronically controllable, for example, one or more electronically controllable valves may be provided and controlled to control and regulate hydraulic pressure effective to selectably actuate and control clutch 25, the gearset 24, and the lockup clutch 53 between engaged and disengaged states.

When a vehicle system 20 is at a stop with the engine 32 running, the clutch 25 is closed or engaged, and the lockup clutch 53 open or disengaged, the turbine 54 is held in a rotationally fixed position due to its mechanical coupling to the gearset 24 which is, in turn, held in a rotationally fixed position by the ground engaging wheels 29 which may themselves be held stationary by the vehicle brakes. In this state, the impeller 52 pumps fluid against the resistance of the fixed turbine 54. During neutral at stop (NAS) operation, one or more components of the ECS 40 (e.g., the TCY 44 or another component of an ECS) controls the clutch 25 is open or disengage permitting the turbine 54, input shaft 56 and input side of the clutch 25 to rotate free of a load imposed by the gearset 24. This has the effect of reducing the fluid pumping resistance or load on the impeller 52. The vehicle system 20 may be determined to be at a stop based on a velocity condition of the vehicle being at, near, or approaching zero and may be further based on depression of the brake pedal such that if the brake pedal is released when the vehicle is at a stop, NAS operation may be discontinued and the clutch 25 closed or engaged to couple the turbine 54, input shaft 56, and input side of the clutch 25 with the output side of the clutch 25 and the gearset 24

Under a number of operating conditions and scenarios, the reduction in resistance or load provided by NAS operation improves fuel economy and decreased fuel consumption. While counterintuitive or unexpected, however, improved fuel economy and decreased fuel consumption may be obtained by providing variable NAS operation under which NAS operation is enabled under certain operating conditions and scenarios and is disabled under certain operating conditions and scenarios. For example, in duty cycles with low engine loads and high stop frequencies, disabling NAS operation may provide such benefits by reducing the frequency and/or duration of aftertreatment system thermal management events.

Figure 3:
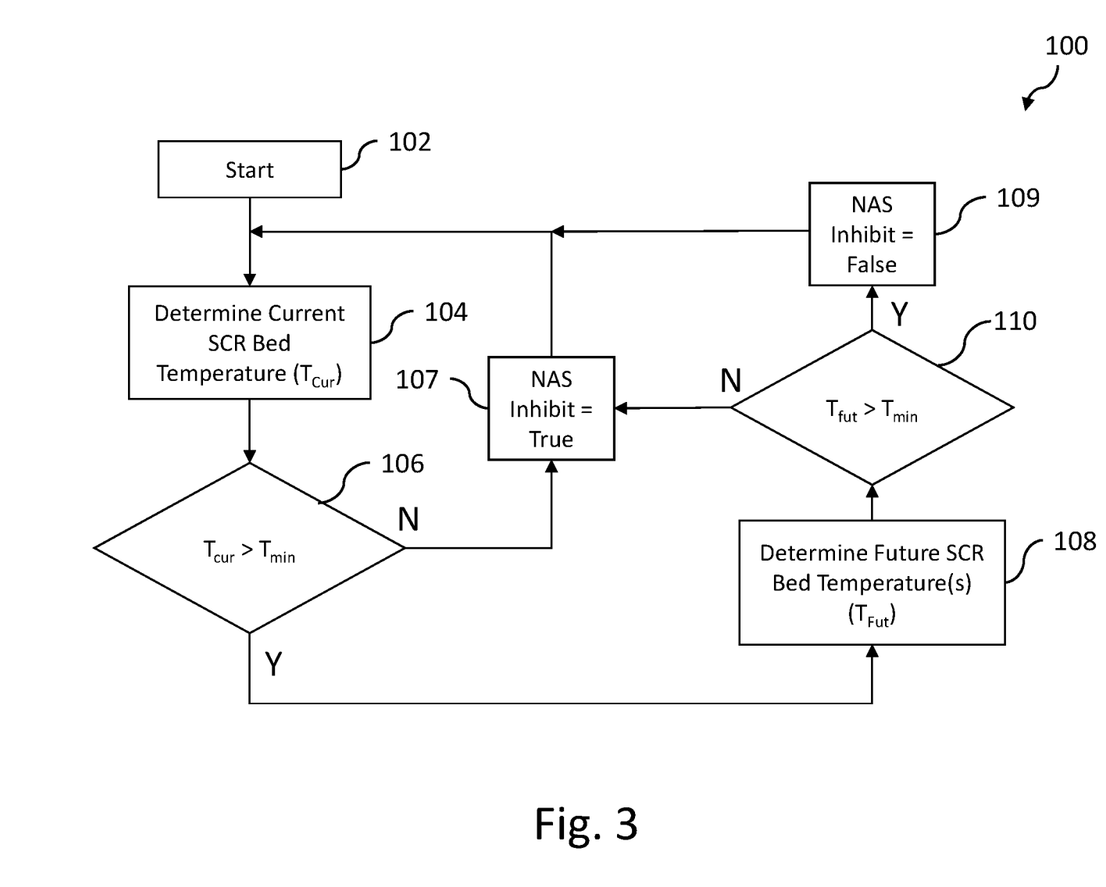
FIG. 3 is a flow diagram illustrating certain aspects of an example control process.

With reference to FIG. 3, there is illustrated a flow diagram of an example control process 100 which may be implemented and executed in connection with one or more components of an electronic control system in operative communication with a vehicle system, for example, one or more components of the ECS 40, such as ECU 42 and/or one or more other components of the ECS 40. Control process 100 begins at start operation 102 and proceeds to operation 104 which determines a current SCR bed temperature ($T_{Cur}$). Operation 104 may determine a value of $T_{Cur}$ using a number of components, operations, and techniques. While directly measuring or sensing temperature of an SCR catalyst bed may be theoretically possible, in practice a value of $T_{Cur}$ may be determined using a model based upon one or more indicia correlated with or indicative of a current SCR bed temperature. A number of models may be utilized, for example, a value of $T_{Cur}$ may be modeled based on one or more temperature measurements taken at various locations relative to an SCR catalyst, for example, an SCR catalyst inlet temperature, an SCR catalyst outlet temperature, a turbine outlet temperature, a temperature taken at other points along an exhaust flowpath including an SCR catalyst, or combinations of the foregoing and/or other indicia. The model may further account for the thermal mass of the SCR catalyst. The determination performed by operation 104 may include actively calculating or estimating a value of $T_{Cur}$, or reading or referencing a previously and/or separately determined value of $T_{Cur}$. The determination performed by operation 104 may utilize one or more calculations, computations, estimations, approximations, or other techniques in determining a value of $T_{Cur}$. In some embodiments, operation 104 may determine a value of $T_{Cur}$ using techniques according to controls 120 which are illustrated and described in connection with FIGS. 4 and 5.

From operation 104, control process 100 proceeds to conditional 106 which evaluates whether $T_{Cur}$ satisfies an SCR bed minimum temperature criterion ($T_{min}$). The evaluation performed by conditional 106 may include evaluating whether $T_{Cur}$ is greater than or is greater than or equal to $T_{min}$ or to $T_{min}$ plus a margin of error. The evaluation may include a hysteresis and may evaluate whether $T_{Cur}$ satisfies $T_{min}$ for a time period or number of occurrences or evaluations. If conditional 106 evaluates that $T_{Cur}$ does not satisfy $T_{min}$, process 100 proceeds to operation 107 which sets an NAS inhibit condition to true. When set to true, the NAS inhibit condition is effective to inhibit one or more components of an electronic control system in operative communication with a vehicle system from performing NAS operation, for example, one or more components of the ECS 40, such as TCU 44 and/or other components of the ECS 40. The NAS inhibit condition may be stored in memory and accessed by one or more components which are thereby inhibited from performing or initiating NAS operation and/ or may be transmitted or broadcast to one or more components which are thereby inhibited. From operation 107, process 100 proceeds to operation 104 and further proceed as described above.

If conditional 106 evaluates that $T_{Cur}$ does satisfy $T_{min}$, process 100 proceeds to operation 108 which determines one or more future SCR Bed temperature(s) ($T_{Fut}$). Operation 108 may determine a value of $T_{Fut}$ using a number of components, operations, and techniques. For example, a number of models may be utilized to determine a value of $T_{Fut}$. Such models may be based on a value of $T_{Cur}$ and one or more temperature measurements taken at various locations which influence $T_{Fut}$, for example, an ambient air temperature, an intake manifold temperature, an exhaust mass flow, SCR catalyst thermal mass, future vehicle operating conditions (e.g., look-ahead engine load, look-ahead road grade, look-ahead engine fueling, and/or other look-ahead parameters), combinations of two or more of the foregoing, or combinations of one or more of the foregoing and one or more other indicia. The determination performed by operation 104 may utilize one or more calculations, computations, estimations, approximations, or other techniques in determining a value of $T_{Fut}$. In some embodiments, operation 104 may determine a value of $T_{Fut}$ using techniques according to controls 120 which are illustrated and described in connection with FIGS. 4 and 5.

From operation 108, control process 100 proceeds to conditional 110 which evaluates whether $T_{Fut}$ satisfies an SCR bed minimum temperature criterion ($T_{min}$) which may be the same criterion evaluated in connection with conditional 108 or a separate and potentially different minimum temperature criterion. The evaluation performed by conditional 108 may include evaluating whether $T_{Fut}$ is greater than or is greater than or equal to $T_{min}$ or to $T_{min}$ plus a margin of error. The evaluation may evaluate whether $T_{Fut}$ will satisfy a time period or number of occurrences or evaluations. If conditional 108 evaluates that $T_{Fut}$ does not satisfy $T_{min}$, process 100 proceeds to operation 107 and operates and proceeds as described above.

If conditional 106 evaluates that $T_{Fut}$ does satisfy $T_{min}$, process 100 proceeds to operation 109 which sets an NAS inhibit condition to false. When set to false, the NAS inhibit condition does not inhibit or permits one or more components of an electronic control system in operative communication with a vehicle system from performing NAS operation. From operation 109, process 100 proceeds to operation 104 and operates and proceeds as described above.

Figure 4:
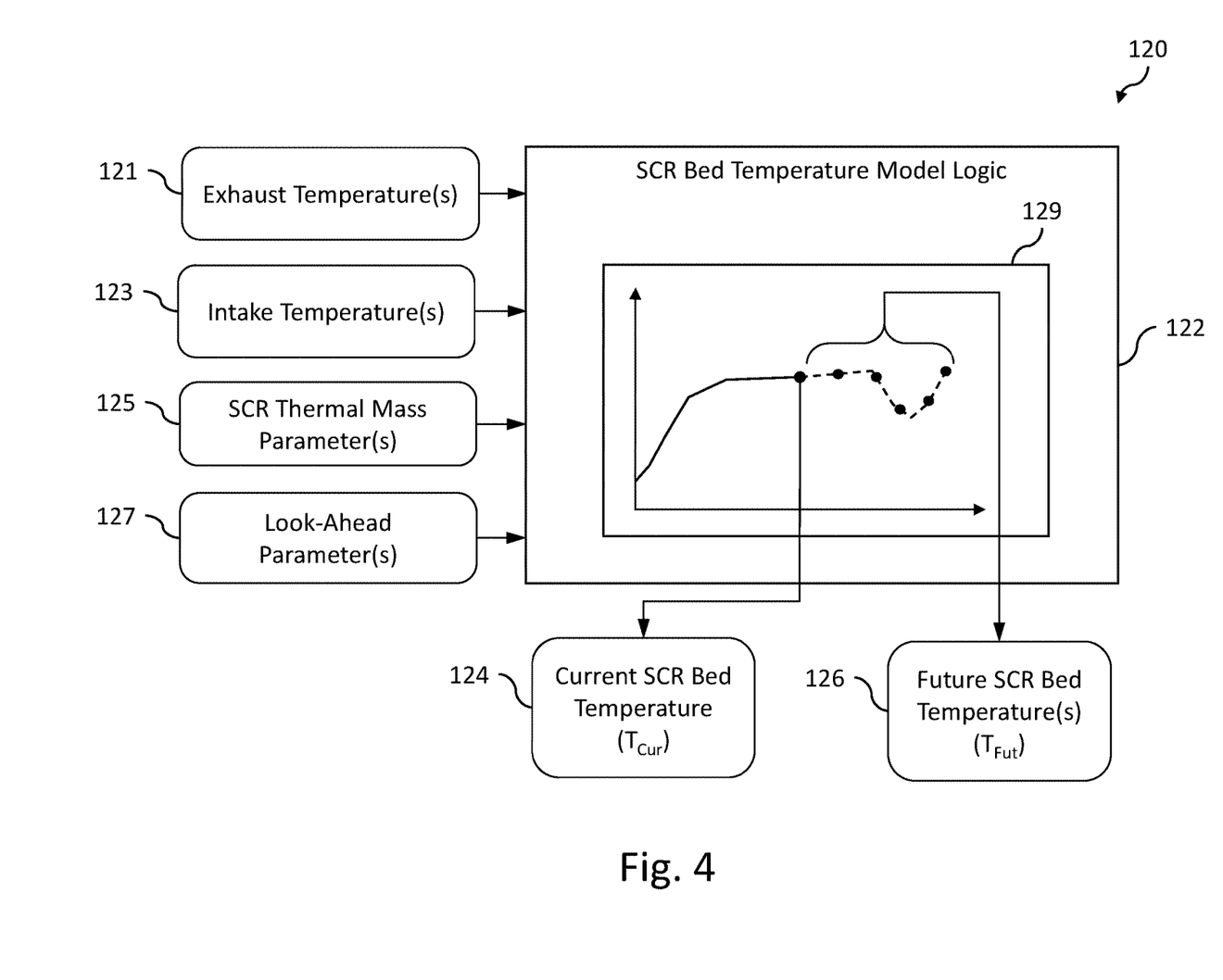
FIG. 4 is a schematic diagram illustrating certain aspects of example vehicle controls.

With reference to FIG. 4, there is illustrated a schematic diagram of example controls 120 which may be implemented in and executed by one or more components of an electronic control system in operative communication with a vehicle system, for example, one or more components of the ECS 40, such as ECU 42 and/or one or more other components of the ECS 40. Controls 120 include SCR bed temperature model logic 122 which implements a dynamic model 129 of SCR bed temperature as a function of time. SCR bed temperature model logic 122 receives as inputs exhaust temperature(s) 121, intake temperature(s) 123, SCR thermal mass parameters 125, and look-ahead parameters 127, and may also receive additional or alternative input parameters.

The exhaust temperature(s) 121 may include one or more of an SCR catalyst inlet temperature, an SCR catalyst outlet temperature, a turbine outlet temperature, a temperature difference (Delta-T) of two or more locations such as an exhaust downpipe delta-T, and a temperature taken at other locations along an exhaust flowpath including an SCR catalyst. The SCR bed temperature model logic 122 may utilize the exhaust temperature(s) 121 in determining a current SCR bed temperature ($T_{Cur}$). In some embodiments, the SCR bed temperature model logic 122 may use an SCR inlet temperature as a model of $T_{Cur}$ (e.g., $T_{Cur}$=SCR inlet temperature, or $T_{Cur}$=SCR inlet temperature−an offset or error margin). In some embodiments, the SCR bed temperature model logic 122 may use an SCR outlet temperature as a model of $T_{Cur}$ (e.g., $T_{Cur}$=SCR outlet temperature, or $T_{Cur}$=SCR outlet temperature−an offset or error margin). In some embodiments, the SCR bed temperature model logic 122 may use an SCR inlet temperature and an SCR outlet temperature as a model of $T_{Cur}$ (e.g., $T_{Cur}$=avg (SCR inlet temperature, SCR inlet temperature) where avg denotes an average, such as a mean or a weighted average offset). The SCR bed temperature model logic 122 may also utilize exhaust mass-flow and/or thermal mass, density, or inertia parameters of an SCR catalyst element. For example, the SCR bed temperature model logic 122 may predict a future SCR catalyst temperature by modeling an SCR a temperature change ($\Delta T$) associated with an SCR catalyst using parameters indicating thermal energy transferred (Q) to the SCR catalyst, thermal mass ($C_{th}$) of the SCR catalyst, and the relationship $\Delta T=Q/C_{th}$. Example parameters indicating thermal energy transferred (Q) include exhaust mass flow, one or more upstream exhaust temperatures, and predictions of future values thereof. Thermal mass ($C_{th}$) associated with the SCR catalyst may be determined as the product of an SCR catalyst mass and specific heat capacity. The SCR bed temperature model logic 122 may provide a value $T_{Cur}$ as output 124 which may be stored in memory and/or may be transmitted or broadcast and thereafter accessed and utilized by one or more other components or processes of an electronic control system, for example, by control process 100.

The intake temperature(s) 123 may include one or more of an ambient temperature, a charge intake temperature, a compressor outlet temperature, an intake manifold temperature, and a temperature taken at other points along an intake system. The SCR thermal mass parameters 125 may be predetermined or calibratable parameters set for a given SCR catalyst utilized in connection with controls 120. The look-ahead parameters 127 may include parameters from which a predicted future exhaust temperature may be determined, for example, operator demand, vehicle speed, grade, aerodynamic load, vehicle mass, or other parameters impacting engine load.

The SCR bed temperature model logic 122 may utilize the current SCR bed temperature ($T_{Cur}$), the intake temperature(s) 123, the SCR thermal mass parameter(s) 125, and the look-ahead parameters 127 in determining one or more future SCR Bed temperature(s) ($T_{Fut}$). In general, one or more future SCR Bed temperature(s) ($T_{Fut}$) may be determined based $T_{Cur}$, an SCR catalyst thermal mass parameter, and a predicted future exhaust temperature, for example, a predicted SCR inlet temperature at future time j ($T_{SCR\_inlet\_j}$). In turn, $T_{SCR\_inlet\_j}$ may be determined based on a predicted intake temperature at future time j ($T_{intake\_j}$), which may be a predicted future ambient temperature, charge intake temperature, compressor outlet temperature, intake manifold temperature, or another intake system temperature, and predicted future combustion temperature increase at future time j ($\Box T_{comb\_j}$) which may be predicted based on future engine load information.

The SCR bed temperature model logic 122 may provide one or more values $T_{Fut}$ as output 126 which may be stored in memory and/or may be transmitted or broadcast and thereafter accessed and utilized by one or more other components or processes of an electronic control system, for example, by control process 100.

The SCR bed temperature model logic 122 may determine or predict SCR catalyst temperatures in response to a vehicle system operating mode (e.g., an engine operating mode) determined by one or more other components of the ECS 40. In certain embodiments, the ECS 40 may set or select an operating mode as a normal mode, a thermal management mode, or an aggressive thermal management mode. The normal mode may operate an engine without attempting to actively control or modify a temperature of the SCR catalyst. The thermal management mode may attempt to actively control or modify a temperature of the SCR catalyst by controlling or modifying one or more operating parameters associated with the engine in order to increase one or more exhaust aftertreatment system temperatures (e.g., SCR catalyst temperature) to a desired level or threshold. The one or more operating parameters may comprise, for example, turbocharger parameters such as nozzle geometry or other geometry variable geometry turbocharger (VGT), intake throttle positions, injection timing, and/or a number and timing of injection events such as post, late post very late post or other injections providing post-cylinder temperature increase. The thermal management mode may attempt to actively control or modify a temperature of the SCR catalyst to a greater degree by controlling or modifying one or more operating parameters. In certain forms, a NAS capability may be selectably enabled or disabled/inhibited as a function of our engine operating mode.

Figure 5:
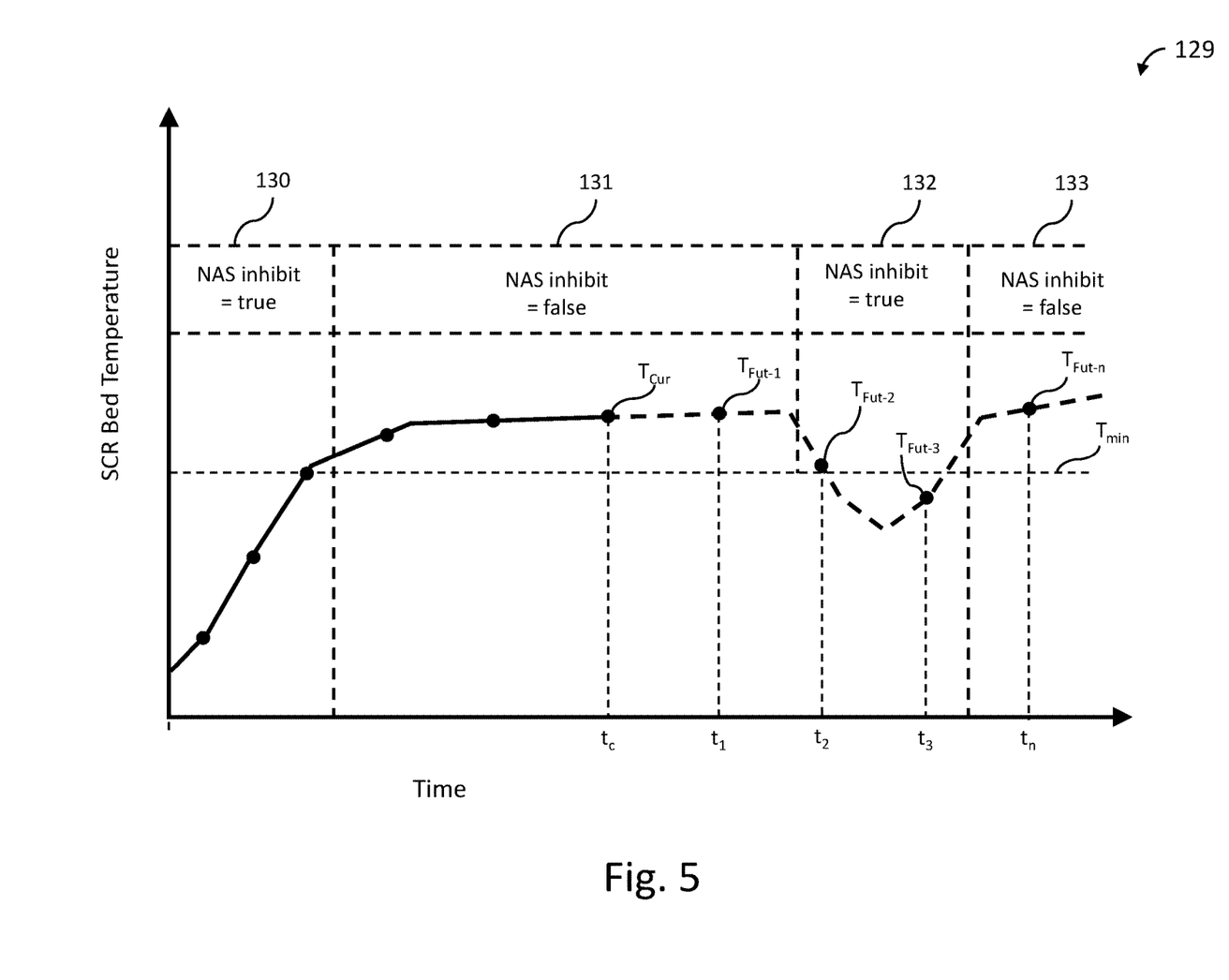
FIG. 5 is a graph illustrating s dynamic model of SCR bed temperature as a function of time.

With reference to FIG. 5, there are illustrated further details of dynamic model 129 of SCR bed temperature as a function of time. In the illustrated state, the dymanic model 129 has determined a current SCR bed temperature ($T_{Cur}$) at a current time (tc) and a plurality of future SCR bed temperatures ($T_{Fut-1}$, $T_{Fut-2}$, $T_{Fut-3}$, $T_{Fut-n}$) at a corresponding and of future times ($t_1$, $t_2$, $t_3$, $t_n$). In prior operating states, the dymanic model 129 made multiple similar determinations of then-current and future SCR bed temperatures at a plurality of prior points in time. Based on the relationship between the current and future temperatures and an SCR bed minimum temperature criterion ($T_{min}$) a control process, such as control process 100, has and will set the NAS inhibit=true for time ranges 130 and 132, and has and will set the NAS inhibit=false for time ranges 131 and 133.

Figure 6:
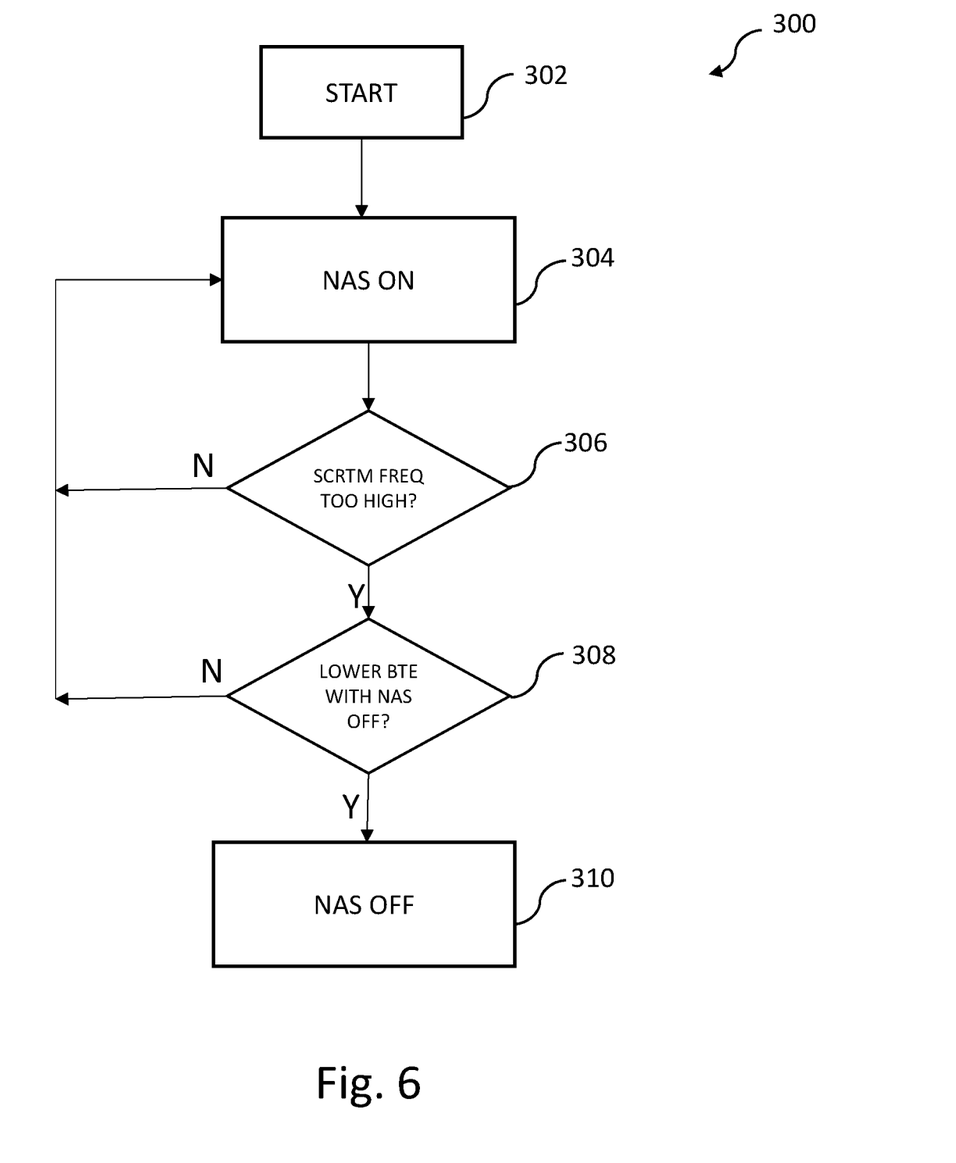
FIG. 6 is a flow diagram illustrating certain aspects of a variable state neutral at stop operation.

With reference to FIG. 6, there is illustrated a flow diagram of an example procedure 300 for a variable NAS operation in vehicle system 20. Procedure 300 may be implemented and executed in connection with one or more components of the ECS 40 such as one or more of the components of the ECS 40 described above in connection with vehicle system 20 or in a number of other ECS components. Procedure 300 begins at start operation 302 and proceeds to operation 304 which enables NAS operation. It shall be appreciated that the vehicle system 20 may be operated with NAS normally ON. From operation 304, procedure 300 proceeds to conditional 306 which evaluates an exhaust aftertreatment thermal management metric that evaluates operation of an SCR catalyst provided in the exhaust aftertreatment system. The exhaust aftertreatment thermal management metric provides an indication of frequency, duration, or usage of operation of the SCR catalyst in a thermal management mode which increases non-torque producing energy to increase temperature of the SCR catalyst.

A number of exhaust aftertreatment thermal management metrics and acts of evaluating may be utilized. In some forms, the exhaust aftertreatment thermal management metric may comprises a time or count of thermal management operating and the act of evaluating may include utilizing a counter or a timer to track operation of the SCR catalyst in the thermal management mode. In some forms, the exhaust aftertreatment thermal management metric may comprises SCR catalyst temperature information (which may comprise a current measurement and/or a series of past temperature measurements) and the act of evaluating may include utilizing an SCR catalyst temperature to predict if operation of the SCR catalyst in the thermal management mode exceeds a predetermined threshold. Another example aspect of the act of evaluating may include utilizing a combination of one of a counter and a timer, and an SCR catalyst temperature. Yet another example aspect of the act of evaluating may include an evaluation of a kinetic intensity metric of operation of the system. Another example aspect of the act of evaluating may include utilizing a combination of (a) one of a counter and a timer, (b) an SCR catalyst temperature, and (c) an evaluation of kinetic intensity.

If conditional 306 determines that SCR thermal management usage is not too high, procedure 300 returns to operation 304 to keep the NAS ON. If conditional 306 determines that SCR thermal management usage is too high, procedure 300 continues to conditional 308 which determines if system has a lower brake thermal efficiency (BTE) with NAS OFF. For example, if there are high frequency of vehicle stop and the SCR thermal management usage is too high, conditional 308 evaluates BTE with and without NAS to determine whether turning NAS OFF is more economical. If conditional 308 determines that system does not have a lower BTE with NAS OFF, procedure 300 returns to operation 304 to keep the NAS ON. If conditional 308 determines that system does have a lower BTE with NAS OFF, procedure 300 proceed to operation 310 to turn NAS OFF.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A vehicle system comprising:
    an engine;
    a transmission including a torque converter configured to receive torque from the engine and an electronically controllable clutch configured to selectably couple and decouple the torque converter and a gearset;
    a selective catalytic reduction (SCR) exhaust aftertreatment system configured to receive exhaust from the engine; and
    an electronic control system in operative communication with the engine, the electronically controllable clutch, and the SCR exhaust aftertreatment system, the electronic control system being configured to:
    evaluate whether an SCR catalyst temperature satisfies at least one minimum temperature criterion by being one of greater than and greater than or equal to the at least one minimum temperature criterion,
    in response to the SCR catalyst temperature satisfying the minimum temperature criterion, permit a neutral at stop operation wherein the electronically controllable clutch is controlled to selectably decouple the torque converter and the one or more gears at least in part in response to the vehicle system being in a stopped state, and
    in response to the SCR catalyst temperature not satisfying the minimum temperature criterion, prevent the neutral at stop operation.

2. The vehicle system of claim 1, wherein the at least one minimum temperature criterion comprises a current SCR catalyst temperature.

3. The vehicle system of claim 1, wherein the at least one minimum temperature criterion comprises a current SCR catalyst temperature and at least one future SCR catalyst temperature.

4. The vehicle system of claim 3, wherein the at least one future SCR catalyst temperature is determined in response to the current SCR catalyst temperature, at least one predicted future intake temperature, an SCR catalyst at least one SCR catalyst thermal mass parameter, and at least one predicted future exhaust temperature.

5. The vehicle system of claim 4, wherein the at least one predicted future exhaust temperature is determined in response to at least one of a predicted future intake temperature and a predicted future combustion temperature increase.

6. The vehicle system of claim 5, wherein the at least one predicted future combustion temperature increase is determined in response to at least one predicted future engine load.

7. The vehicle system of claim 1 wherein the SCR catalyst temperature is determined based at least in part on an operating mode of the vehicle system.

8. The vehicle system of claim 7 wherein the operating mode comprises one of a normal mode wherein the electronic control system does not attempt to actively control or modify temperature of the SCR catalyst, and a thermal management mode wherein the electronic control system attempts to actively control or modify temperature of the SCR catalyst.

9. A method of operating an electronic control system in operative communication with a vehicle system including an electronically controllable clutch configured to selectably couple and decouple a torque converter and a gearset, and a selective catalytic reduction (SCR) exhaust aftertreatment system configured to receive exhaust from an engine, the method comprising:
    evaluating whether an SCR catalyst temperature satisfies at least one minimum temperature criterion,
    in response to the SCR catalyst temperature satisfying the minimum temperature criterion, permitting a neutral at stop operation wherein the electronically controllable clutch is controlled to selectably decouple the torque converter and the one or more gears at least in part in response to the vehicle system being in a stopped state, and
    in response to the SCR catalyst temperature not satisfying the minimum temperature criterion, preventing the neutral at stop operation.

10. The method of claim 9, wherein the at least one minimum temperature criterion comprises a current SCR catalyst temperature.

11. The vehicle system of claim 9, wherein the at least one minimum temperature criterion comprises a current SCR catalyst temperature and at least one future SCR catalyst temperature.

12. The method of claim 11, wherein the at least one future SCR catalyst temperature is determined in response to the current SCR catalyst temperature, at least one predicted future intake temperature, an SCR catalyst at least one SCR catalyst thermal mass parameter, and at least one predicted future exhaust temperature.

13. The method of claim 12, wherein the at least one predicted future exhaust temperature is determined in response to at least one of a predicted future intake temperature and a predicted future combustion temperature increase.

14. The method of claim 13, wherein the at least one predicted future combustion temperature increase is determined in response to at least one predicted future engine load.

15. The method of claim 9 wherein the SCR catalyst temperature is determined based at least in part on an operating mode of the vehicle system.

16. The method of claim 15 wherein the operating mode comprises one of a normal mode wherein the electronic control system does not attempt to actively control or modify temperature of the SCR catalyst, and a thermal management mode wherein the electronic control system attempts to actively control or modify temperature of the SCR catalyst.

17. A method comprising:
 operating a system including an engine operatively coupled to an exhaust aftertreatment system, and a controller configured to control the engine and the exhaust aftertreatment system;
 evaluating-an exhaust aftertreatment thermal management metric, the exhaust aftertreatment thermal management metric providing an indication of operation of the system in a mode that increases exhaust aftertreatment temperature using energy that does not contribute to torque output of the engine;
 enabling neutral-at-stop (NAS) controls in response to the exhaust aftertreatment thermal management metric indicating a fuel economy benefit of the enabling; and
 disabling the NAS controls in response to the exhaust aftertreatment thermal management metric indicating a fuel economy benefit of the disabling.

18. The method of claim 17, wherein the act of evaluating includes evaluating operation of a selective catalyst reduction (SCR) catalyst provided in the exhaust aftertreatment system.

19. The method of claim 17, wherein the exhaust aftertreatment thermal management metric correlates with operation of a selective catalyst reduction (SCR) catalyst provided in the exhaust aftertreatment system in a thermal management mode.

20. The method of claim 19, wherein the thermal management mode increases non-torque producing energy to increase temperature of the SCR catalyst.

21. The method of claim 19, wherein the act of evaluating utilizes a counter or timer to track operation of the SCR catalyst in the thermal management mode.

22. The method of claim 19, wherein the act of evaluating utilizes an SCR catalyst temperature to predict if operation of the SCR catalyst in the thermal management mode exceeds a predetermined threshold.

23. The method of claim 19, wherein the act of evaluating utilizes a combination of one of a counter and a timer, and an SCR catalyst temperature.

24. The method of claim 19, wherein the act of evaluating includes an evaluation of kinetic intensity of operation of the system.

25. The method of claim 19, wherein the act of evaluating utilizes a combination of (a) one of a counter and a timer, (b) an SCR catalyst temperature, and (c) an evaluation of kinetic intensity.

26. The method of claim 19, wherein a most recent SCR thermal management operation is used to predict if the SCR thermal management frequency operations exceed the predetermined threshold.

* * * * *